United States Patent [19]

Yucius

[11] 4,284,978
[45] Aug. 18, 1981

[54] CONVEYING SYSTEM CONTROL

[75] Inventor: Albert C. Yucius, Brockton, Mass.

[73] Assignee: Systems Engineering & Manufacturing Corp., Stoughton, Mass.

[21] Appl. No.: 63,070

[22] Filed: Aug. 2, 1979

[51] Int. Cl.³ .................... H04Q 9/00; B66C 19/00
[52] U.S. Cl. .......................... 340/147 P; 212/132; 414/136
[58] Field of Search ............. 340/147 P, 23, 149 R, 340/166 R; 414/136, 134, 152; 235/92 MP, 92 PD; 212/132

[56] References Cited

U.S. PATENT DOCUMENTS

| | | | |
|---|---|---|---|
| 2,980,264 | 4/1961 | Burt et al. | 340/166 R |
| 3,262,420 | 7/1966 | Bossi et al. | 414/152 |
| 3,587,050 | 6/1971 | Durante | 340/149 R |
| 3,803,561 | 4/1974 | Yucius | 414/136 |
| 3,815,084 | 6/1974 | Pease | 340/23 |
| 3,996,568 | 12/1976 | Sturm et al. | 414/136 |
| 4,068,597 | 1/1978 | Moyer | 414/134 |

Primary Examiner—Donald J. Yusko
Attorney, Agent, or Firm—Wolf, Greenfield & Sacks

[57] ABSTRACT

A control scheme is used in a conveying system which is preferably a programmable conveying system of the station searching type including a wagon with a hoist that is capable of traveling between a number of different stations in the system. One or more of the stations has the control which in the disclosed embodiment is a rectifier setting control associated with a tank at a station. At the time that the piece being conveyed is loaded at a load position, the operator introduces a coded card or the like carried by the hoist, which card may be subsequently read by a reader with the data on the card representative of a particular rectifier setting. This data in a binary form is conveyed by a multiple bit data bus to a digital to analog converter. If the system includes a plurality of stations to be controlled then the data is coupled to all digital to analog converters. The control further provides means for selectively enabling only one of the converters depending upon the attitude of the hoist and the location of the hoist. Thus, when the hoist is at the proper tank, data from the card or other indicia is read and the converter is enabled to thereby provide an analog output control signal for controlling the rectifier associated with the tank to in turn control a process such as an electroplating process.

20 Claims, 5 Drawing Figures

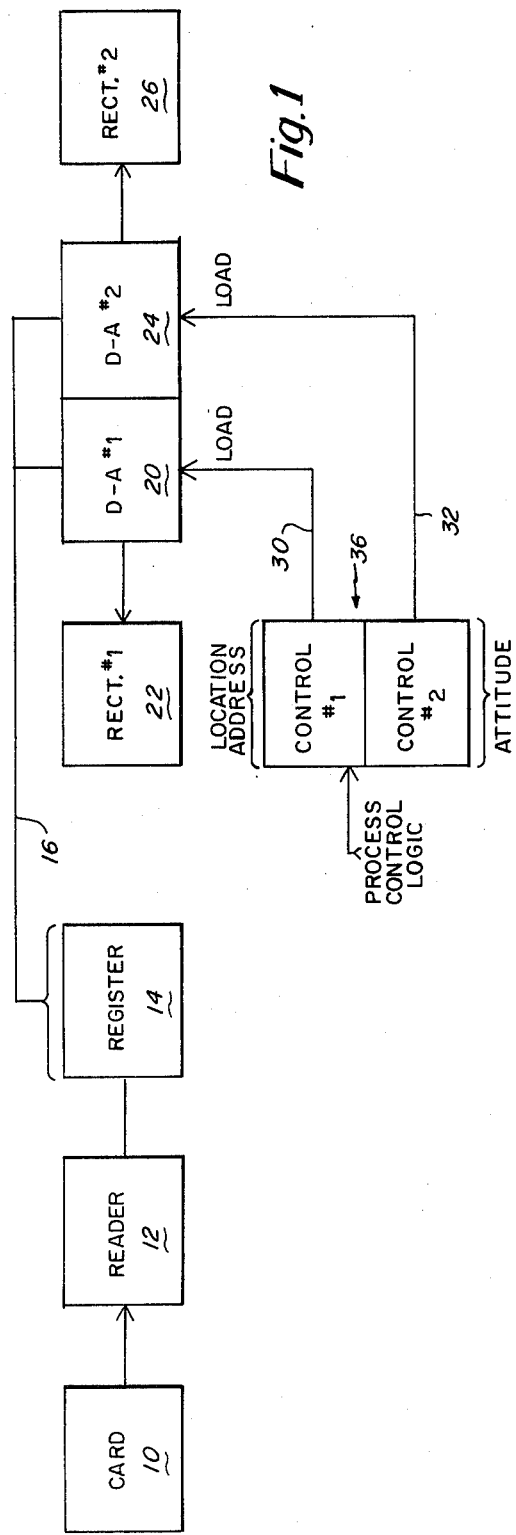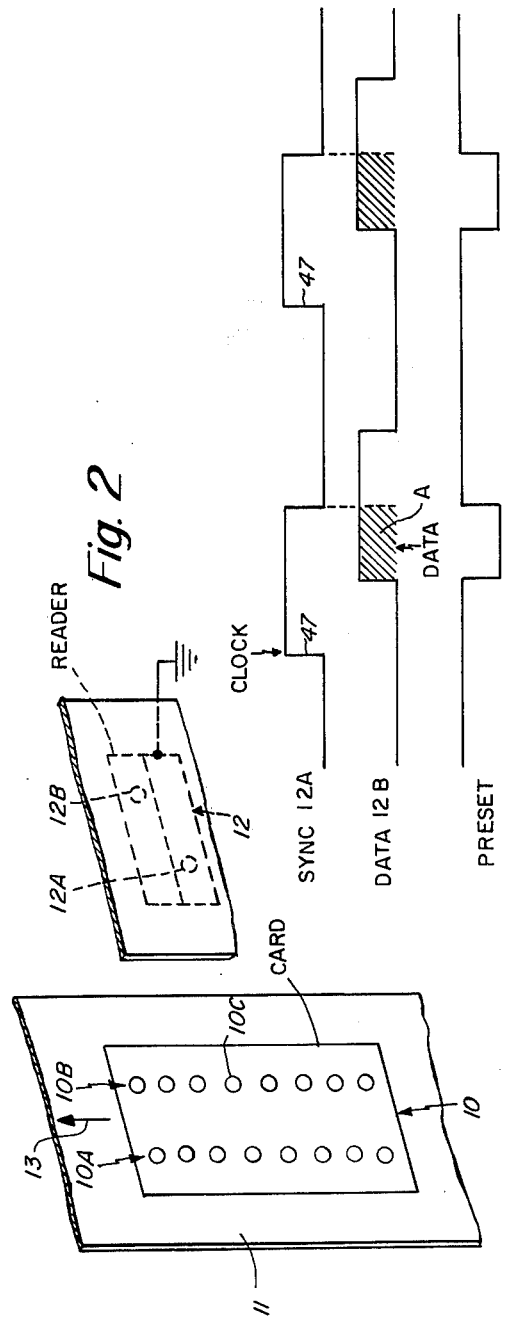

CONVEYING SYSTEM CONTROL

BACKGROUND OF THE INVENTION

The present invention relates in general to a conveying or hoist system which is preferably of the programmable type. More particularly, the present invention relates to a conveying or hoist system having an improved control in accordance with the present invention to control certain parameters at one or more stations in the system. The principle parameter being controlled in accordance with the disclosed embodiment is a rectifier.

An automatic conveying system has found extensive use in the field of electroplating. As part of the electroplating process there are tanks at locations in the system having settings associated therewith usually under rectifier control to assure a predetermined thickness of deposit on the piece being electroplated. It is common for the operator of the system to make the rectifier setting dependent upon his knowledge of the particular piece being conveyed. This, of course requires the operator to periodically make the rectifier adjustments at each tank. This also means that an inexperienced operator may quite easily make the improper setting for the electroplating process. Another technique employs a mechanical device on the flight bar of the hoist which may be adjusted by the operator and which activates a receiver on the target tank when the piece enters the tank. This technique has become troublesome because of the corrosive atmosphere associated with the tank so that proper control has not always been provided. Another technique that has been used is the use of computers to make the system essentially entirely programmable. However, this tends to make the system quite expensive and thus not justified from a practical standpoint. This is further complicated by the difficulty with a computer system to account for interruptions in the conveyer system such as a manual interruption of motion of the hoist.

It has also been found more recently that it is desirable to provide a more precise control of the electroplating process or like process. This control is by means of control of the rectifiers which in turn control the amp-hours of power applied in the tank during this plating process.

Accordingly, one object of the present invention is to provide an improved control for a conveying system. The control in accordance with this invention is in particular a control for rectifiers or the like for controlling the plating in an electroplating process so as to control the thickness of plating. Although the principles of the invention are described in connection with rectifier control, it is understood that the principles of the invention may also be used in association with other types of control. For example, the control signal, rather than setting a predetermined rectifier power level, could set a timer for controlling the duration of say a spray step.

Another object of the present invention is to provide an improved control for a programmable conveying or hoisting system of the station searching type.

A further object of the present invention is to provide an improved control system that operates accurately and is not effected by any interruption, or operation of the program not previously programmed.

A further object of the present invention is to provide an improved control system in accordance with this invention that provides precise control and that can be used and operated even by a relatively unskilled operator.

Still another object of the present invention is to provide an improved control system that does not require mechanical switching devices and in particular such devices that must operate directly in the tank environment.

SUMMARY OF THE INVENTION

To accomplish the foregoing and other objects of this invention there is provided a system and associated method for providing an automatic control scheme which in the disclosed embodiment is for the control of rectifiers associated with tanks in the system in connection with an electroplating process to be automatically conducted. The conveying system typically includes a wagon comprised of a stationary member and a hoist with the wagon progressing from station to station possibly under some type of preprogrammed automatic control. For example, reference is made herein to my issued U.S. Pat. No. 3,803,561 which shows a programmable conveying system of the station searching type. Of the different stations traversed by the wagon, the control in accordance with the present invention is at certain ones of these stations such as at a tank having associated therewith a rectifier for controlling a phase of an electroplating process.

The control of the present invention is comprised of a reader associated with the hoist, a register for storing a code from the reader, one or more digital to analog converters and station control logic. The station control logic includes separate control segments, one corresponding with each converter that is used in the system. Thus, if two tanks are to be controlled, there are two converters, one associated with each tank and also two control logic blocks, each associated with a tank and its corresponding converter. At a loading station, the operator of the system inserts a card or the like means having indicia thereon representative of a code which is interpreted by the reader and stored in the register. This code is transferred in parallel to the digital to analog converters but the code is only latched or loaded into one converter which is selectively enabled from the control logic as a function of, inter alia, wagon position. In the disclosed embodiment, the code that is read is a binary code preferably in binary coded decimal (BCD) corresponding to an analog output voltage by which the rectifiers are to be controlled. The operator of the system may even be an unskilled person who is simply instructed that for a particular piece a particular card is to be used. The person need not even know what code is on the card or what voltage at the rectifier the code represents. The card is preferably read upon each lift operation, but the control is only enabled when the wagon is at the proper predetermined station and at a proper preselected attitude. In this connection the control logic includes means for receiving an address representative of wagon position and further has a switch array that can be set to a particular address corresponding to a station and which control is to take place. When there is coincidence between the wagon address and the location address, then the appropriate digital to analog converter is enabled or loaded with the digital signal taken from the reader register from a previous lift sequence. This analog voltage then directly controls the station rectifier output level to in turn control the electroplating process.

DESCRIPTION OF THE DRAWINGS

Numerous other objects, features and advantages of the invention should now become apparent upon a reading of the following detailed description taken in conjunction with the accompanying drawings, in which:

FIG. 1 is a block diagram of a system in accordance with the present invention;

FIG. 2 schematically depicts the physical arrangement of the reader and card of FIG. 1;

DETAILED DESCRIPTION

Figure 3:
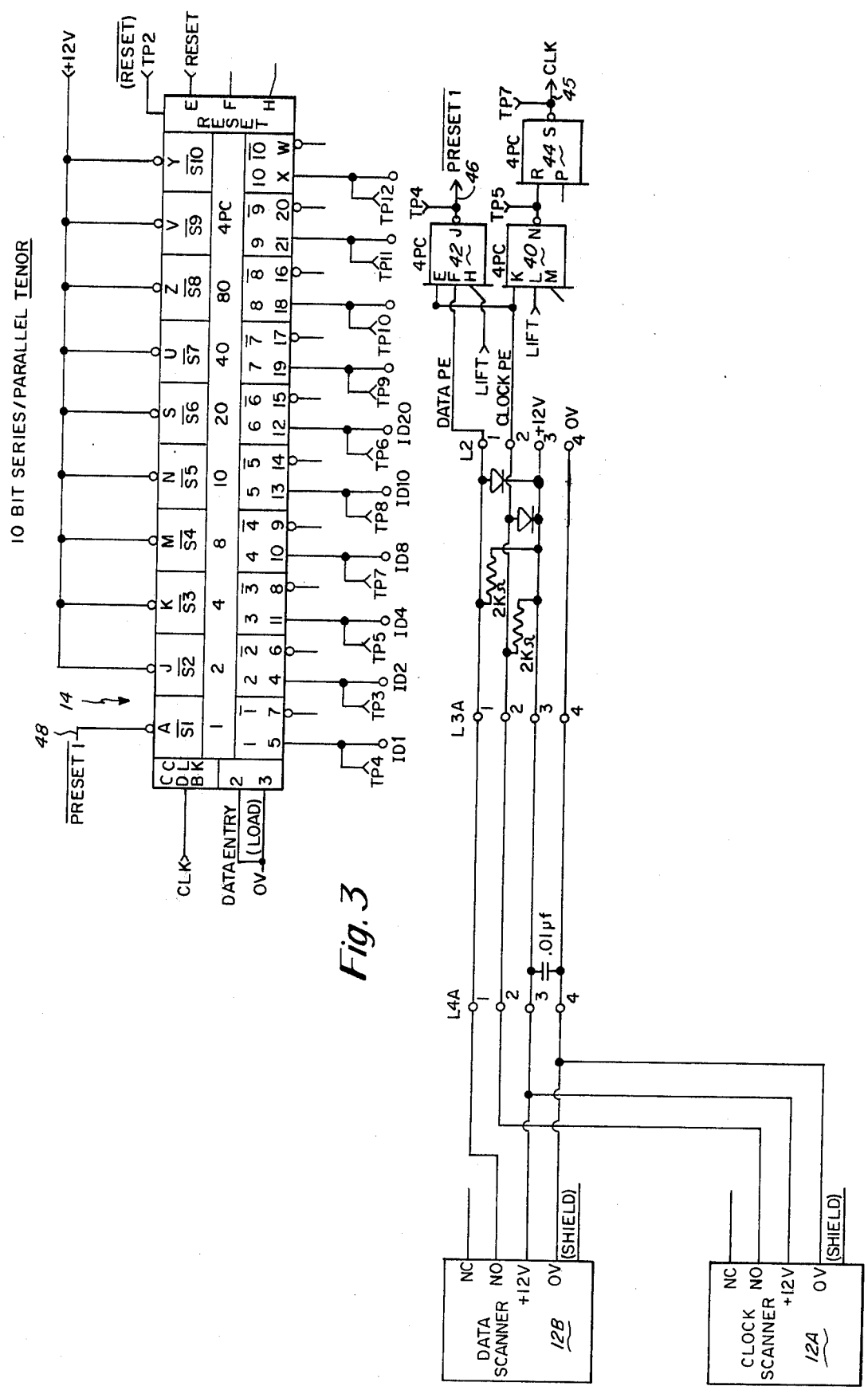
FIG. 3 shows further detail from a logic standpoint of the reader and register of FIG. 1.
Figure 4A:
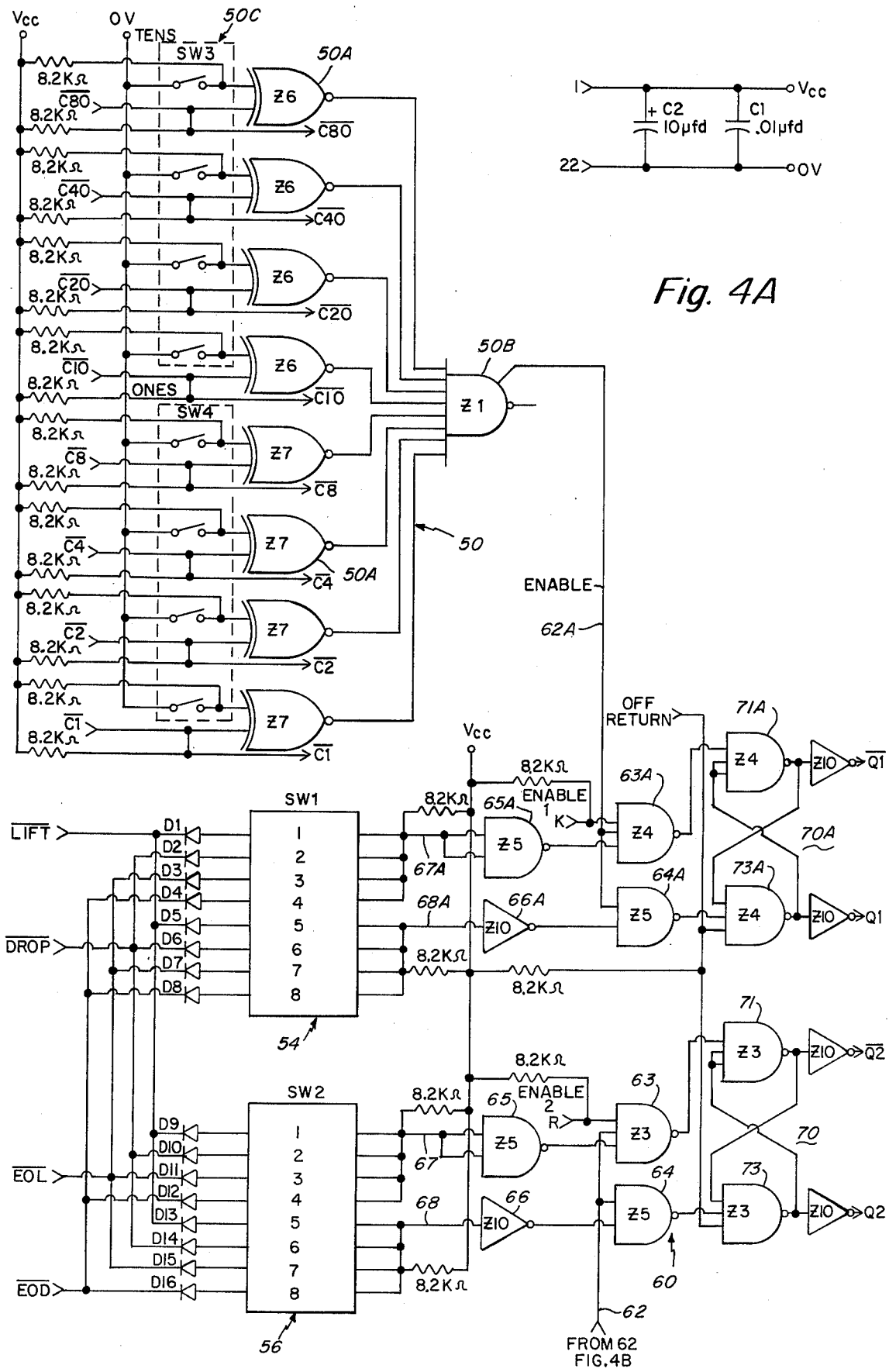
FIGS. 4A and 4B show the process control logic also depicted in FIG. 1 for two station control.
Figure 4B:
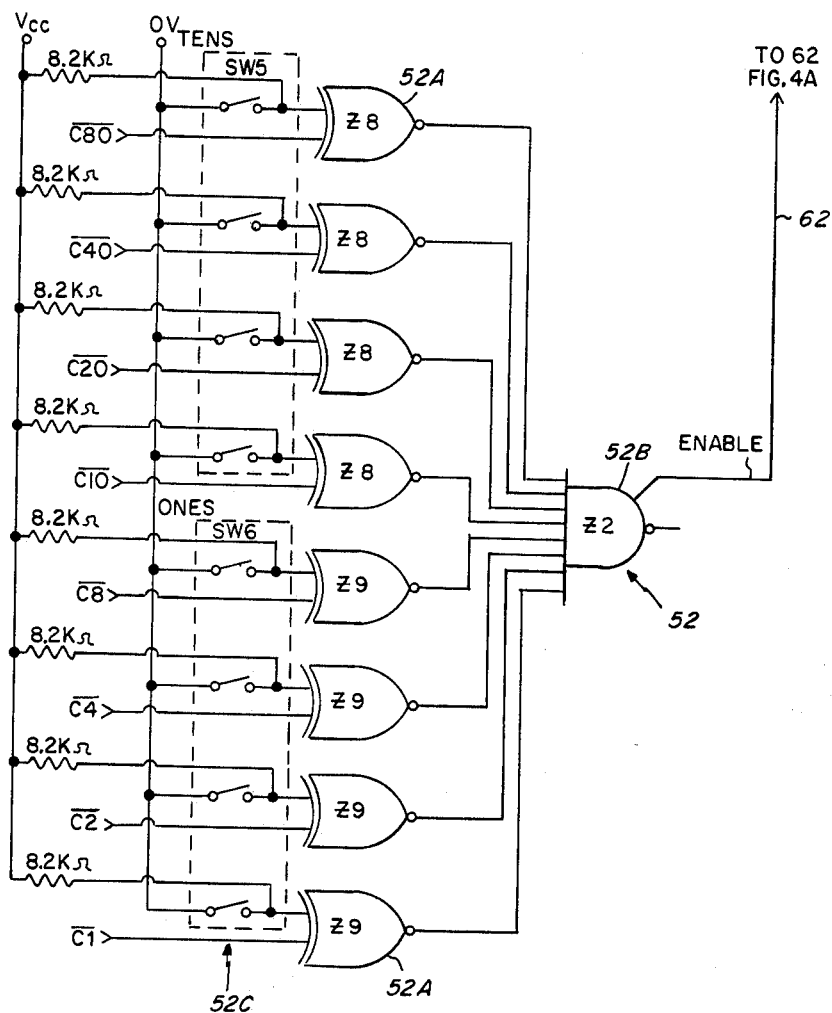

FIG. 1 shows in a very general sense the components of the control system of the present invention. FIGS. 2-4 show further details of some of the blocks depicted in FIG. 1. The control system of FIG. 1 may be used in connection with a conveying system such as a programmable system shown in my U.S. Pat. No. 3,803,561. Such a system is of the station searching type including counter means described in my patent for continuously keeping track of the location of the wagon, which location is represented by an address code. This code is also used in connection with the present description and, in particular, the description of FIGS. 4A and 4B described in detail hereinafter.

In a conveying system there is usually one location which may be referred to as a loading location or loading station where the pieces being conveyed are loaded onto the hoist. At that position, the card 10 depicted in block form in FIG. 1 is loaded by the operator onto the work bar at the load station. The reader 12 depicted in FIG. 1, comprises a phototransistor-photocell arrangement for reading the card 10 and logic means described in FIG. 3 for directing the code on card 10 into the register 14. The register 14 is also described in FIG. 3 and is preferably a shift register having a serial/parallel input, a preset input and a parallel output. The line 16 in FIG. 1 represents the parallel output from the register 14 which couples to the converters 20 and 24. Because FIG. 1 is a schematic general block diagram, single lines are depicted although the line 16 in FIG. 1 is actually a series of conductive lines which are preferably eight separate data lines coupling from the shift register 14 to both digital to analog converters 20 and 24. The output of these converters couple, respectively, to rectifiers 22 and 26. Rectifiers are known devices as are the digital to analog converters 20 and 24. Each of these converters may be of the type sold by Datel Systems Inc. of Canton, Mass. identified as their DAC-HK Series converter. Each of the rectifiers 22 and 26 receives an analog control voltage which establishes the amp-hours of power applied at the tank associated with the particular rectifier for controlling such a process as an electroplating process to control the thickness of the plating. With the use of the converter this control voltage can be controlled precisely to in turn control the thickness of plating precisely, assuming that the immersion time is a constant. It is noted in FIG. 1 that the parallel lines represented by the line 16 connect in common to both converters referred to herein as converters #1 and #2. Data may be presented to the converters 20 and 24 upon each lift sequence but the converters are only enabled upon the proper selective signals to the load inputs thereof by way of lines 30 and 32 from the control #1 and control #2 sections of the process control logic 36. The process control logic 36 of FIG. 1 is responsive to a location address representative of the position of the wagon and also to attitude controls discussed hereinafter. The two control sections of the logic 36 are each individually presettable to identify a particular station at which the control is to occur. Further description of the control logic 36 is in connection with the description of FIGS. 4A and 4B.

FIG. 2 shows the card 10 which may be removably received by the hoist 11. The card 10 may be received in an aligning pocket on the flight bar of the hoist. When the operator is loading the hoist of the conveying system, the coded card 10 is inserted into the pocket with the code thereon indicating the desired rectifier setting at the target tank. The card 10 may be of plastic or cardboard and contains basically two channels 10A and 10B. The channel 10A comprises eight bits and is referred to as the sync channel. The channel 10B also contains eight bits of data and is of the data channel. The data is represented by the presence or absence of reflective discs in the areas 10C. The cards can each be previously identified with the operator being provided an instruction list identifying which card is to be used for different pieces being processed.

In an alternative arrangement the card 10 may have all reflective areas and it may be fixed in position. In association with the card there is provided a mask which can cover certain of the reflective areas to thus code the card in accordance with the pattern on the mask. Also, with the use of a mask, this technique would lend itself to a key operator system where the masks or templates are produced by an operator on demand. In this way it is not necessary to have separate reflector cards for each setting but instead one can employ cards having all reflectors and use them in association with masks for producing the desired data patterns.

In FIG. 2 the reader 12 is on a stationary frame of the hoist so that during a lift operation there is relative movement between the card 10 and the reader 12. The reader 12 is provided with optical detectors 12A and 12B which are arranged in a staggered or skewed arrangement as depicted in FIG. 2. FIG. 2 also shows by way of arrow 13 the direction of movement of card 10 relative to the reader. In this connection the optical detector 12A reads channel 10A while the optical detector 12B reads the channel 10B. It is preferred that all of the areas 10C of channel 10A are reflective so that there are eight sync pulses generated by way of the optical detector 12A. These sync pulses are effectively clock pulses that clock the data forward in register 14. With the use of equal spacing for the reflectors the clock pulses are symmetrical. Actually, the equal spacing of the sync pulses is not totally essential but it is important that there be alignment between the sync and associated data channels.

The arrangement of the reader 12 and the card 10 means that a sync signal is received at the optical detector 12A prior to any data being received at the detector 12B. Each of the detectors 12A and 12B may comprise a light source and associated phototransistor or photocell. FIG. 2 also shows waveforms associated with the detectors or scanners 12A or 12B. It can be seen that there is an overlap in the area A. In this connection, reference is now made to FIG. 3 which shows the clock scanner 12A and the data scanner 12B providing the respective clock and data outputs. These outputs couple to the NAND gates 40 and 42. The gate 40 receives the clock input and a LIFT signal. The gate 42 receives the LIFT signal, the clock signal and also the data signal. The output of gate 40 is coupled by way of inverter 44 to provide a clock signal on line 45 which couples to the clock input of the shift register 14. The output from gate 42 on line 46 couples to the present input 48 of the register 14. In FIG. 2 the waveform at the reader 12B represents a binary ONE. If a data pulse is missing, then there is a lack of coincidence between the two channels and this represents a binary ZERO. The third waveform shown in FIG. 2 represents the preset output from gate 42. The gate 42 essentially senses the coincidence of data in both channels representative of reflectors in both channels.

The logic of FIG. 3 operates so that the gates 40 and 42 are only enabled during a lift operation and thus it is only during a lift that data from a card 10 is input into the shift register 14. At the rising clock edge 47 of the clock signal, the output on line 45 also is positive going and causes a clocking at the clock input to the shift register 14. At the time of occurrence of the first clock pulse there is not yet any coincidence sensed by the gate 42 and thus the signal on line 46 from gate 42 to the input 48 of the register is at its high state essentially presetting a ZERO in parallel into the register 14. Thus, at the time of the first clock signal there is in effect no data coupled into the register. In another sense one can consider that the clock pulse enters a ZERO into the register. However, prior to the occurrence of the next clock pulse a signal to the present input at line 48 is coincidence sensed by the gate 42. If the signal on line 48 is at a ZERO level, this indicates the presetting of a ONE and vice versa. Thus, prior to the occurrence of the next clock pulse the data on the preset input is entered into the register on a continued basis. There is no final clock pulse after the final preset but this is not necessary because the entered final preset state is stored in the first position without being clocked along the register.

The optical detection system shown in FIG. 2 has a key advantage in that it will operate even though there may be variations in speed with which the card traverses past the reader. Also, this arrangement which relies primarily upon edge triggering for clocking and coincidence or lack of coincidence for data will operate even upon interruption followed by resumption of motion between the card and reader.

After all of the data from the card has entered the register 14, then the register 14 has this parallel data on line 16 coupled to the converters 20 and 24. It is noted that although the register may have a reset input, it is not necessary to provide any resetting for the register. With the parallel input preset technique of this invention, the new data that is read in may simply be reintroduced over any old data in the register 14. Also, as previously indicated, because of the edge triggering even if there is an interruption in the motion of the card, this will not destory the data being entered into the register 14.

FIGS. 4A and 4B show the process control logic 36 of FIG. 1. This logic is for two station control in association with the two converters 20 and 24 of FIG. 1. The logic 36 includes comparators 50 and 52, switches 54 and 56, and output logic gating 60. Each of the comparators 50 and 52 are of substantially the same construction. For example, comparator 50 includes eight gates 50A and an output gate 50B and a switch array 50C. Similarly, the comparator 52 includes gates 52A, output gate 52B, and the switch array 52C. Each of the switch arrays comprise eight separate switches, each of which individually connects to one input of one of the gates 50A, 52A. The gates 50A and 52A are exclusive NOR gates such as CD4077BE. The output gates 50B and 52B are used as AND gates. Each of the switch arrays 50C, 52C is separated into two groups each comprising four individual switches. One set of four switches represents a "ones" digit while the other four switches represents a "tens" digit. The four switches are used to represent a decimal number in BCD. All eight switches in a group connect to one inut of each of the gates 50A, 52A. Thus, the selective positions of each of the individual switches is meant to represent a particular station including stations zero through ninety-nine. Thus, the comparator 52 could have its eight switches arranged to decode station 26, whereas the comparator 50 could have its switches arranged to decode different stations such as station 55.

The input to each of the comparator gates 50A, 52A from the switches represents a fixed or reference output. The other input to each of these gates is an address that is continuously updated and identified the position of the wagon at all times in the conveying system. This address signal is represented also by eight bits identified in two groups as signals $\overline{C1}$, $\overline{C2}$, $\overline{C4}$ and $\overline{C8}$; and $\overline{C11}$, $\overline{C12}$, $\overline{C14}$ and $\overline{C18}$. In this connection, reference is made to my U.S. Pat. No. 3,803,561 which shows as part of the overall system a retentive memory showing similar outputs representing an address representative of the position of the wagon. Thus, the gates 50A and 52A shown in FIGS. 4A and 4B are for sensing a comparison between the preset address (station) as represented by the switches and the present address as identified by the location counter outputs.

When all of the gates 52A or 50A are satisfied then all of the outputs therefrom are in their high state and there is a high level enabling signal on the output lines from the gates 50B and 52B. Of course, each of the switch arrays 50C and 52C would be typically set to different addresses and thus the enable at the output of the gates 50B and 52B would occur at different wagon locations. Also, because we are discussing a system having a single wagon then the output signals from gates 50B and 52B will not occur at the same wagon station.

If the comparator 52 senses a comparison because the wagon has now arrived at a target station where rectifier control is to take place then there is an enabling signal on line 62 to the gates 63 and 64. The other inputs to gates 63 and 64 are from inverters 65 and 66, respectively. These inverters in turn couple from the output lines 67 and 68, respectively from switch 56. The output logic also includes gates 63A and 64A, inverter 65A and 66A, and output lines 67A and 68A associated with switch array 54. The output enabling signal on line 62A couples to gates 63A and 64A.

The particular arrangement of the switches 54 and 56 provide attitude control so that the output signals Q1 and Q2 are only developed at the proper attitude of the hoist. The system shows the signals LIFT, DROP, EOL and EOD. The latter two signals represent an end of lift and end of drop state. All four of these signals couple to the switches or shunts 54 and 56. One can interconnect these switches in a different manner so that one of the four signals controls at the output lines 67A, 68A or 67 and 68. Thus, if the control is upon a drop operation a set signal is coupled, for example, on line 67 to gate 65 and the output of gate 63 provides a low level signal for setting the flip-flop 70 which comprises gates 71 and 73. The setting of this flip-flop 70 provides a high level signal on the output terminal Q2 and a low level signal on the negation output Q2. Similarly, there is also a flip-flop 70A comprised of gates 71A and 73A which can be activated by an enabling signal on line 62A rather than an enabling signal on line 62. After the drop signal has terminated then there can be a reset signal on line 68, for example, that causes by way of gates 64 and 66, a resetting of the flip-flop 70 at gate 73. This action resets the flip-flop and essentially terminates the Q2 output enabling signal.

Previously in FIG. 1 there was shown lines 30 and 32 coupling from the process control logic. The line 30 may intercouple from the Q1 input of FIG. 4 to the first digital to analog converter. Similarly, the output line 32 may couple from the Q2 output in FIG. 4 to the second digital to analog converter.

Once the operator has loaded the wagon and has inserted the card 10 then the wagon progresses from station to station until one of the target stations is reached. This condition is sensed by one of the comparators of FIG. 4 and when the hoist is at the proper preset attitude then an enabling signal is generated such as a signal on line 30 to the first digital to analog converter associated with this first station at which control is to take place. As indicated in FIG. 1 the signal on line 30 is a load signal or an enabling signal to the converter 20 permitting the generation of an output analog signal to the rectifier 22, the magnitude of which is a function of the input digital signal on multiwire line 16 from the register 14.

Although the principles of the invention are described in connection with rectifier control, it is understood that the principles of the invention may also be used in association with other types of control. For example, one may want to identify the arrival at a particular station with the coded card being used to control alternative decisions that can be made at the station, or possibly where to move from that station. In another version one may want to detect where to store a fixture that has just been lifted, such as in a storage and retrieval system.

What is claimed is:

1. An automatic conveying system for work pieces and having a hoist moveable between a plurality of stations said hoist having relative fixed and moveable members with the moveable member for moving the work piece into and out of a treatment vessel at a station, said system comprising;
    a load disposed at a target station and adapted to be controlled to in turn control a process operation on said work piece at said target station,
    coded indicia means with the code representing a non-travel with control parameter,
    means associated with the hoist for receiving the coded indicia means,
    means for reading said coded indicia means,
    load control means for controlling the load as a function of said sensed coded indicia means,
    and means for sensing arrival of the hoist at the target station to enable said load control means.

2. An automatic conveying system as set forth in claim 1 wherein said code represents a magnitude.

3. An automatic conveying system as set forth in claim 2 wherein the load includes a rectifier and the code controls the magnitude of the rectifier setting.

4. An automatic conveying system as set forth in claim 1 wherein the coded indicia means includes a coded card removably received by the hoist.

5. An automatic conveying system as set forth in claim 4 wherein said means for receiving the coded indicia means includes a card pocket.

6. An automatic conveying system as set forth in claim 1 wherein the load control means includes a digital to analog converter having an analog output voltage for controlling the load.

7. An automatic conveying system as set forth in claim 6 including a plurality of load control means each receiving in common the coded indicia signal.

8. An automatic conveying system as set forth in claim 1 wherein in the means for sensing includes comparator means receiving a station address and a preset address.

9. An automatically controlled conveying system, comprising;
    conveying apparatus including hoist apparatus moveable between a plurality of stations in the system including at least a load station and a target station,
    code identification means with the code representing a control parameter associated with the target station for controlling an operation accomplished at the target station,
    means associated with the hoist apparatus for receiving the code identification means loaded at the load station and including means for reading and storing the code,
    and load control means responsive to said code and to said hoist apparatus arriving at the target station for controlling the load in accordance with said code.

10. A system as set forth in claim 9 wherein said code represents a magnitude of the control parameter, said load comprising rectifier means with the code controlling the magnitude of the rectifier means setting.

11. A system as set forth in claim 9 wherein said load control means includes means for sensing arrival of the hoist apparatus at the target station and parameter control means receiving said code.

12. A system as set forth in claim 11 wherein said sensing means includes comparator means receiving a station address representative of the target station and an address code continuously representative of hoist apparatus position.

13. A system as set forth in claim 12 wherein said sensing means includes output logic circuit means coupled from said comparator means for providing an enable or load signal to said parameter control means.

14. A system as set forth in claim 13 wherein said sensing means further includes attitude control means responsive to at least one hoist attitude signal for controlling the time of occurrence of the enable signal.

15. A system as set forth in claim 14 wherein said attitude signal provides initiation of load control at one of lift and drop operation.

16. A system as set forth in claim 15 wherein said parameter control means includes a digital to analog control means enabled from said output logic circuit means and providing an output analog control voltage represented by the code from the code identification means.

17. A system as set forth in claim 16 wherein said comparator means includes switch means.

18. A system as set forth in claim 15 wherein said attitude control means includes switch control means.

19. A method of controlling a load at a target station tank in an automatic conveying system having a hoist moveable between a plurality of station susing a coded indicia means to control the load, comprising the steps of; loading work pieces at a first load station, loading the coded indicia means onto the hoist, reading and storing the coded indicia signal, said coded indicia means representing a control parameter for the load to control a process operation on said work pieces at the target tank, controlling the load based on said control parameter to in turn control the process operation, and sensing arrival of the hoist at the target station to enable said control only upon reaching the target station.

20. A method as set forth in claim 19 including controlling the load in accordance with an attitude parameter.

* * * * *